United States Patent
Huang et al.

(10) Patent No.: US 10,154,510 B2
(45) Date of Patent: Dec. 11, 2018

(54) CELLULAR COMMUNICATION AND D2D COMMUNICATION COEXISTENCE METHOD, SYSTEM AND DEVICE, AND STORAGE MEDIUM

(71) Applicant: ZTE Corporation, Shenzhen, Guangdong (CN)

(72) Inventors: Ying Huang, Shenzhen (CN); Lin Chen, Shenzhen (CN); Yuqin Chen, Shenzhen (CN); Feng Xie, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 74 days.

(21) Appl. No.: 15/127,573

(22) PCT Filed: Jul. 18, 2014

(86) PCT No.: PCT/CN2014/082494
§ 371 (c)(1),
(2) Date: Sep. 20, 2016

(87) PCT Pub. No.: WO2015/139391
PCT Pub. Date: Sep. 24, 2015

(65) Prior Publication Data
US 2018/0110060 A1   Apr. 19, 2018

(30) Foreign Application Priority Data

Mar. 20, 2014 (CN) .......................... 2014 1 0106355

(51) Int. Cl.
*H04W 4/80* (2018.01)
*H04W 72/12* (2009.01)
*H04W 72/04* (2009.01)

(52) U.S. Cl.
CPC ......... *H04W 72/1215* (2013.01); *H04W 4/80* (2018.02); *H04W 72/042* (2013.01); *H04W 72/1284* (2013.01)

(58) Field of Classification Search
CPC . H04W 76/023; H04W 8/005; H04W 72/042; H04W 92/18; H04W 72/04;
(Continued)

(56) References Cited

U.S. PATENT DOCUMENTS

| 8,824,326 B2 | 9/2014 | Wang |
| 2012/0051315 A1 | 3/2012 | Wang |

(Continued)

FOREIGN PATENT DOCUMENTS

| CN | 102282901 A | 12/2011 |
| CN | 102388666 A | 3/2012 |

(Continued)

OTHER PUBLICATIONS

International Search Report in international application No. PCT/CN2014/082494, dated Dec. 26, 2014, 6 pgs.
(Continued)

*Primary Examiner* — Kwasi Karikari
(74) *Attorney, Agent, or Firm* — Cooper Legal Group, LLC

(57) ABSTRACT

Provided are a cellular communication and device-to-device (D2D) communication coexistence method, system and device, and a storage medium. The method comprises: receiving resource control information (401); and monitoring and receiving D2D information in a resource pool having no network coverage according to the resource control information (402).

17 Claims, 4 Drawing Sheets

(58) Field of Classification Search
CPC . H04W 56/001; H04W 76/046; H04W 88/02; H04W 4/005; H04W 72/12; H04W 88/08; H04W 72/044; H04W 76/048; H04L 5/0048; H04L 5/0055
See application file for complete search history.

(56) References Cited

U.S. PATENT DOCUMENTS

2013/0051358 A1   2/2013  Turtinen
2016/0212793 A1*  7/2016  Jung ................ H04W 36/0016

FOREIGN PATENT DOCUMENTS

| | | |
|---|---|---|
| CN | 102625252 A | 8/2012 |
| CN | 103024911 A | 4/2013 |
| CN | 103648103 A | 3/2014 |

OTHER PUBLICATIONS

English Translation of the Written Opinion of the International Search Authority in international application No. PCT/CN2014/082494, dated Dec. 26, 2014, 17 pgs.

* cited by examiner

CELLULAR COMMUNICATION AND D2D COMMUNICATION COEXISTENCE METHOD, SYSTEM AND DEVICE, AND STORAGE MEDIUM

TECHNICAL FIELD

The disclosure relates to a wireless communication technology, and in particular to a method and system for coexistence of cellular communication and Device-to-Device (D2D) communication, a device and a storage medium.

BACKGROUND

Along with development of wireless multimedia services, requirements of people on high data rate and user experiences increasingly grow, so that higher requirements on system capacity and coverage of a conventional cellular network are made. On the other hand, requirements of people on knowing about and communicating with interested persons or things nearby gradually increase along with prevailing of applications such as a social network, short-distance data sharing and local advertising; and here, the application service such as the social network, short-distance data sharing and local advertising is called proximity service. A conventional cell-based cellular network has obvious limitations in terms of support to high data rate and proximity service, and under such a requirement background, a D2D technology representative of a new direction of future development of communication technologies emerges. Application of a D2D technology may reduce a burden of a cellular network, reduce battery power consumption of User Equipment (UE), increase data rate, improve robustness of a network infrastructure and well meet requirements on a high-data rate service and proximity service.

A D2D technology may work in an authorized frequency band or an unauthorized frequency band, and allows direct discovery/direct communication of multiple pieces of D2D UE with a network infrastructure or without a network infrastructure. There are mainly three D2D application scenarios as follows:

1) UE1 and UE2 perform data interaction under coverage of a cellular network, the cellular network is a network covered by an Evolved Node B (eNB), and a user plane data interaction process is implemented without a network infrastructure, as shown in mode 1 in FIG. 1;

2) UE in a weakly-covered/uncovered area performs relay transmission, as shown in mode 2 in FIG. 1, and UE4 with poorer signal quality is allowed to communicate with the network through UE3 covered by the network nearby, which may help an operating company to extend coverage and improve capacity; and 3) direct communication among equipment is allowed under the condition that the cellular network may not work normally in case of an earthquake or emergency, as shown in mode 3 in FIG. 1, and a control plane and user plane among UE5, UE6 and UE7 may perform one-hop or multi-hop data communication without any network infrastructure.

A D2D technology usually includes a D2D discovery technology and a D2D communication technology:

1) the D2D discovery technology is configured to judge/determine proximity between two or more pieces of D2D UE, for example, judge/determine proximity between two or more pieces of D2D UE within a range where D2D direct communication is allowed, or is configured to judge/determine that first UE is proximal to second UE; and 2) the D2D communication technology refers to a technology for implementing direct communication of part or all of communication data between D2D UE without a network infrastructure.

In a cellular network coverage scenario, D2D communication resources are usually scheduled and allocated by an eNB, which may improve resource reusing efficiency and simultaneously ensure control of a network side over D2D communication and effects of interference coordination between D2D communication and cellular communication. Communication resources of D2D UE may be dynamically scheduled by an eNB, or the eNB may allocate and semi-persistently schedule resources to the D2D UE. In a public security scenario, D2D communication requires high robustness, and may maximally provide service under the current condition of communication resource shortage, congestion or network infrastructure paralysis. Therefore, public security requires D2D communication to work in a network coverage scenario and also work in partial coverage and out-of-coverage scenarios. In the out-of-coverage scenario, D2D UE may work in a self-organization manner, and shares the same resource pool with other D2D UE outside network coverage in a contention manner. The resource pool shared in the out-of-coverage scenario may be acquired from a prose function server or a network element of a core network when the UE is located within network coverage, and for example, is acquired from a proximity service application server.

UE within coverage of a cell is required to have a capability of performing cellular communication with a serving eNB and simultaneously performing D2D communication with D2D UE outside coverage of the serving eNB. For example, UE located on an edge of the cell may be required to transmit or receive D2D information of D2D UE outside the coverage of the serving eNB and simultaneously transmit or receive cellular data within the coverage of the serving eNB, or transmit D2D information by virtue of a resource scheduled by the serving eNB.

When a frequency point of a resource pool used outside coverage of a serving eNB is different from a frequency point used by cellular or D2D communication within the coverage of the serving eNB, UE without a Carrier Aggregation (CA) capability is required to work on the two different frequency points in a time division duplex manner. Moreover, when the UE works on the frequency point used by the resource pool outside the coverage of the serving eNB, the UE suspends reception or transmitting of cellular data of the serving eNB or scheduled D2D information, that is, it is impossible for the UE to perform cellular communication of the serving eNB and dynamically scheduled D2D communication, which makes quality of service of cellular communication and D2D communication and user experiences influenced.

When the frequency point of the resource pool used outside the coverage of the serving eNB is the same as the frequency point used by cellular or D2D communication within the coverage of the serving eNB, the UE may simultaneously monitor and receive D2D information within and outside the coverage of the serving eNB. However, since the UE may have only one radio frequency unit or there may exist a transmitting and reception self-interference phenomenon, D2D information of the same UE on the same frequency point is required to be received and transmitted in a time division manner, and the same UE on the same frequency point is also required to receive D2D information and transmit cellular data in the time division manner. Specifically, when UE receives information in the resource pool outside the coverage of the serving eNB, for example, the UE monitors and receives D2D information in the resource pool outside the coverage of the serving eNB, the serving eNB scheduling the UE to transmit cellular data or D2D information may bring interference to D2D information monitoring and reception of the UE in the resource pool outside the coverage of the serving eNB to reduce receiving performance of the UE and influence quality of service of D2D communication and user experiences.

SUMMARY

In order to solve the existing technical problem, the embodiments of the disclosure provide a method and system for coexistence of cellular communication and D2D communication, a device and a storage medium, which may improve receiving performance of UE, improve quality of service of cellular communication and D2D communication and improve user experiences.

The technical solutions of the embodiment of the disclosure are implemented as follows.

An embodiment of the disclosure provides a method for coexistence of cellular communication and D2D communication, which may include that:

resource control information is received; and

D2D information is monitored and received in a resource pool for out-of-coverage according to the resource control information.

Furthermore, before the step that the resource control information is received, the method may further include that:

indication information is received; and resource related information is transmitted through a Radio Resource Control (RRC) message, a Media Access Control (MAC) Control Element (CE) or Uplink Control Information (UCI) of a Physical Uplink Control Channel (PUCCH) according to the indication information.

Furthermore, before the step that the resource control information is received, the method may further include that: the resource related information is transmitted through the RRC message, the MAC CE or the UCI of the PUCCH.

Furthermore, the method may further include that:

after the resource control information is received, the resource control information is transmitted through an air interface.

Furthermore, the D2D information may include: D2D control information, and/or D2D data.

Furthermore, the D2D control information may include at least one of:

time-domain and/or frequency-domain resource information occupied by D2D data associated with the D2D control information, a Modulation and Coding Scheme (MCS), transmitting power information, resource occupation duration information and D2D group information of the D2D data.

Furthermore, the resource related information may include at least one of:

resource pool information for out-of-coverage, resource information, first time-domain resource pattern information and indication information.

Furthermore, the resource pool information for out-of-coverage may be used for transmission of D2D information corresponding to UE without network coverage;

the resource information may be information about a resource(s), used for transmission of D2D data, of resources for out-of-coverage required to be received by the UE;

the first time-domain resource pattern information may indicate resource pool information used without network coverage or time-domain resource information used by the D2D data required to be received, or may indicate time-domain resource information recommended by the UE and used for reception of D2D information in the resource pool for out-of-coverage; and the indication information may be corresponding indication information about whether the UE is required or not required to monitor or receive D2D information in the resource pool for out-of-coverage.

Furthermore, the resource control information may include at least one of:

second time-domain resource pattern information, acknowledgement information, negative acknowledgement information and Discontinuous Reception (DRx) pattern information.

Furthermore, the first time-domain resource pattern information or the second time-domain resource pattern information may include at least one of:

a time-domain resource repetition cycle, a time-domain offset, a time-domain resource duration and a bit character string, and herein a bit value corresponding to each bit character in the bit character string may indicate whether a corresponding sub-frame is used for transmission of D2D information without network coverage or whether there is D2D information required to be received, or whether the sub-frame can be used for reception of D2D information without network coverage.

Furthermore, the step that the D2D information is monitored and received in the resource pool for out-of-coverage according to the resource control information may include that:

when the resource control information is the second time-domain resource pattern information, the D2D information is monitored and received in the resource pool for out-of-coverage according to a time-domain resource indicated by the second time-domain resource pattern information;

when the resource control information is the acknowledgement information, the D2D information is monitored and received on a resource pool or resource indicated by the resource related information or the resource pool for out-of-coverage according to the acknowledgement information;

when the resource control information is the negative acknowledgement information, the D2D information is not monitored and received on the resource pool or resource indicated by the resource related information or the resource pool for out-of-coverage according to the negative acknowledgement information; and when the resource control information is the DRx pattern information, the D2D information is monitored and received in the resource pool for out-of-coverage during inactive time of a cellular network according to the DRx pattern information.

Furthermore, the time-domain resource indicated by the second time-domain resource pattern information may be a subset of time-domain resources indicated by the first time-domain resource pattern information.

Another embodiment of the disclosure further provides a method for coexistence of cellular communication and D2D communication, which may include that:

resource related information is acquired; and resource control information is determined according to the resource related information, and the resource control information is transmitted.

Furthermore, the step that the resource related information is acquired may include that:

resource related information is acquired from an Operation Administration and Maintenance (OAM) system, a network element of a core network or a prose function server; or resource related information transmitted by UE is received.

Furthermore, before the step that the resource related information is received, the method may further include that:

indication information is transmitted through a System Information Block (SIB) message, an RRC message, a MAC CE or UCI of a PUCCH to indicate whether to transmit the resource related information.

Furthermore, the resource related information may include at least one of:

resource pool information for out-of-coverage, resource information, first time-domain resource pattern information and indication information.

Furthermore, the resource control information may include at least one of:

second time-domain resource pattern information, acknowledgement information, negative acknowledgement information and DRx pattern information.

Furthermore, the method may further include that:

when the determined resource control information is the second time-domain resource pattern information, scheduling for transmitting cellular data, and/or receiving cellular data, and/or transmitting D2D information on a time-domain resource indicated by the second time-domain resource pattern information is avoided;

when the determined resource control information is the acknowledgement information, scheduling for transmitting the cellular data, and/or receiving the cellular data, and/or transmitting the D2D information on a resource pool or resource indicated by resource related information corresponding to the acknowledgement information is avoided; and when the determined resource control information is the negative acknowledgement information, scheduling for transmitting the cellular data, and/or receiving the cellular data, and/or transmitting the D2D information on the resource pool or resource indicated by resource related information corresponding to the negative acknowledgement information is not avoided.

The embodiment of the disclosure further provides a method for coexistence of cellular communication and D2D communication, which may include that:

an eNB acquires resource related information;

the eNB determines resource control information according to the resource related information, and transmits the resource control information to UE; and the UE monitors and receives D2D information in a resource pool for out-of-coverage according to the resource control information.

Furthermore, the step that the eNB acquires the resource related information may include that:

the eNB acquires resource related information from an OAM system, a network element of a core network or a prose function server; or, the eNB receives resource related information transmitted by the UE.

The embodiment of the disclosure further provides UE, which may include:

a reception unit configured to receive resource related information; and a monitoring unit configured to monitor and receive D2D information in a resource pool for out-of-coverage according to the resource control information.

Furthermore, the reception unit may further be configured to receive indication information; and correspondingly, the UE may further include: a transmission unit configured to transmit the resource related information through an RRC message, a MAC CE or UCI of a PUCCH according to the indication information.

Furthermore, the transmission unit may further be configured to, after the resource control information is received, transmit the resource control information through an air interface.

Furthermore, the resource related information may include at least one of:

resource pool information for out-of-coverage, resource information, first time-domain resource pattern information and indication information.

Furthermore, the resource control information may include at least one of:

second time-domain resource pattern information, acknowledgement information, negative acknowledgement information and DRx pattern information.

Furthermore, the monitoring unit may further include:

a first determination subunit configured to, when it is determined that the resource control information is the second time-domain resource pattern information, monitor and receive the D2D information in the resource pool for out-of-coverage according to a time-domain resource indicated by the second time-domain resource pattern information;

a second determination subunit configured to, when it is determined that the resource control information is the acknowledgement information, monitor and receive the D2D information on a resource pool or resource indicated by the resource related information or the resource pool for out-of-coverage according to the acknowledgement information;

a third determination subunit configured to, when it is determined that the resource control information is the negative acknowledgement information, not monitor and receive the D2D information on the resource pool or resource indicated by the resource related information or the resource pool for out-of-coverage according to the negative acknowledgement information; and a fourth determination subunit configured to, when it is determined that the resource control information is the DRx pattern information, monitor and receive the D2D information in the resource pool for out-of-coverage during inactive time of a cellular network according to the DRx pattern information.

The embodiment of the disclosure further provides an eNB, which may include:

an information reception unit configured to acquire resource related information; and an information transmission unit configured to determine resource control information according to the resource related information, and transmit the resource control information.

Furthermore, the information reception unit may further be configured to acquire resource related information from an OAM system, a network element of a core network or a prose function server; or, may be configured to receive resource related information.

Furthermore, if the information reception unit is configured to receive the resource related information, the eNB may further include an indication unit configured to transmit indication information to indicate whether to transmit the resource related information through an SIB message, an RRC message, a MAC CE or UCI of a PUCCH.

Furthermore, the resource related information may include at least one of:

resource pool information for out-of-coverage, resource information, first time-domain resource pattern information and indication information.

Furthermore, the resource control information may include at least one of:

second time-domain resource pattern information, acknowledgement information, negative acknowledgement information and DRx pattern information.

Furthermore, the eNB may further include: a first determination unit configured to, when it is determined that the resource control information is the second time-domain resource pattern information, avoid scheduling for transmitting cellular data, and/or receiving cellular data, and/or transmitting D2D information on a time-domain resource indicated by the second time-domain resource pattern information;

a second determination unit configured to, when it is determined that the resource control information is the acknowledgement information, avoid scheduling for transmitting the cellular data, and/or receiving the cellular data, and/or transmitting the D2D information on a resource pool or resource indicated by resource related information corresponding to the acknowledgement information; and a third determination unit configured to, when it is determined that the resource control information is the negative acknowledgement information, not avoid scheduling for transmitting the cellular data, and/or receiving the cellular data, and/or transmitting the D2D information on the resource pool or resource indicated by resource related information corresponding to the negative acknowledgement information.

The embodiment of the disclosure further provides a system for coexistence of cellular communication and D2D communication, which may include: any abovementioned UE and any abovementioned eNB.

The embodiment of the disclosure further provides a storage medium having stored therein computer-executable instructions configured to execute any of the abovementioned methods for coexistence of cellular communication and D2D communication.

Compared with a conventional art, the method and system for coexistence of cellular communication and D2D communication, device and storage medium provided by the embodiment of the disclosure have the advantages that an opportunity for UE within cellular network coverage of an eNB to receive D2D information on a resource pool outside the network coverage may be controlled by the eNB, that is, the eNB may control the opportunity for the UE within the network coverage to monitor and receive the D2D information in the resource pool for out-of-coverage, so that adopting the embodiment of the disclosure may avoid influence of D2D communication outside the network coverage on cellular communication and D2D communication within the network coverage, and moreover, adopting the embodiment of the disclosure may enable the UE within the network coverage to correctly and effectively receive D2D information transmitted by UE outside the network coverage.

DETAILED DESCRIPTION

Implementation modes of the disclosure will be described below with reference to specific embodiments and the drawings in detail.

Figure 1:
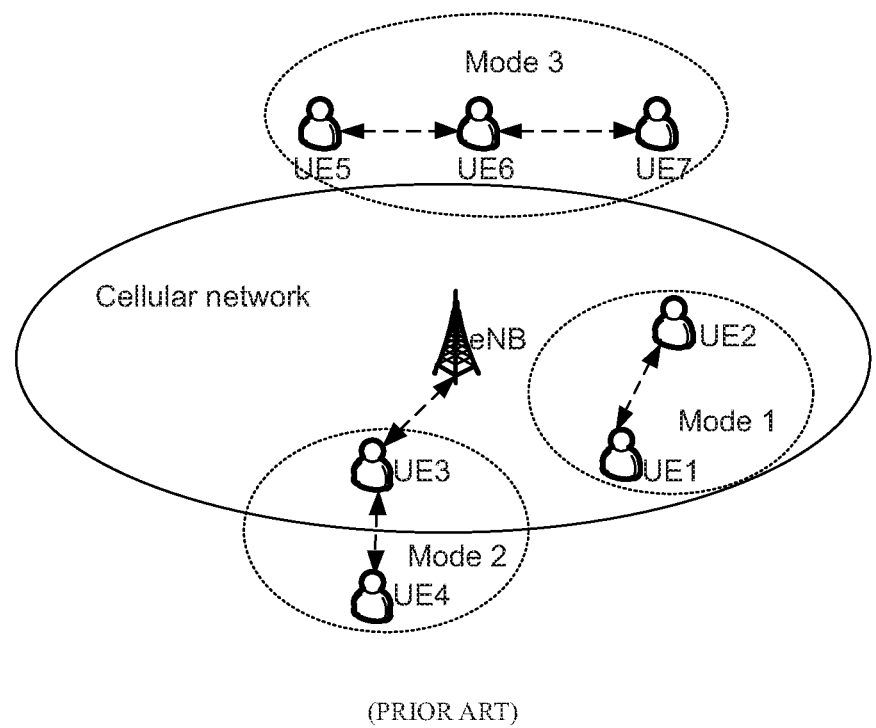
FIG. 1 is a first diagram of an application scenario under the condition of coexistence of cellular communication and D2D communication.
Figure 2:
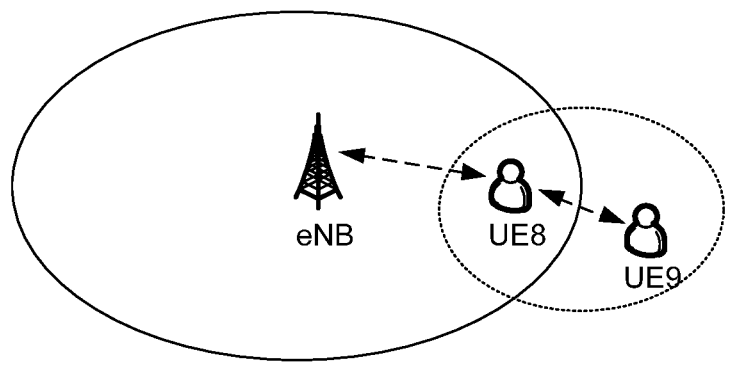
FIG. 2 is a first diagram of an application scenario according to an embodiment of the disclosure.
Figure 3:
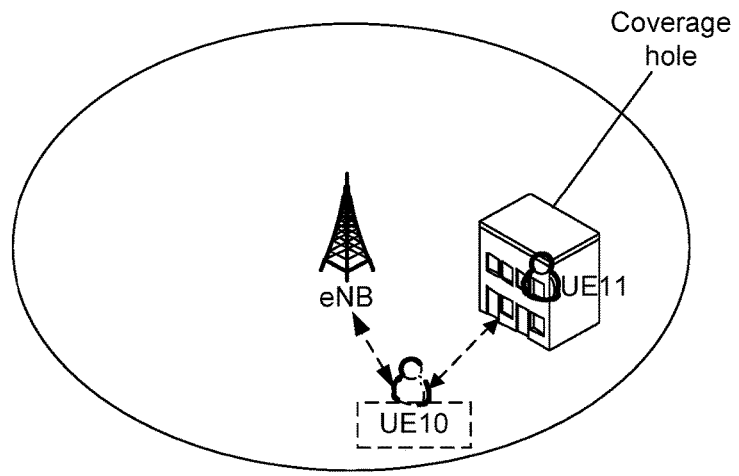
FIG. 3 is a second diagram of an application scenario according to an embodiment of the disclosure.

FIG. 2 is a first diagram of an application scenario according to an embodiment of the disclosure, and as shown in FIG. 2, eNB is an evolved Node B, the ellipse is a cellular network covered by the eNB, UE8 is UE within network coverage and UE9 is UE outside the network coverage, herein UE8 may perform cellular communication with the eNB, and may receive and transmit cellular data in cellular communication; and UE8 may perform D2D communication with UE9 outside the network coverage. FIG. 3 is a second diagram of an application scenario according to an embodiment of the disclosure, and as shown in FIG. 3, eNB is an evolved Node B, the ellipse is a cellular network covered by the eNB, UE10 and UE11 are both UE within network coverage, but under a special condition, for example, that UE11 is located in a building on fire, UE11 may not communicate with the eNB although a geographical position of UE11 is within the coverage of the eNB, so that UE11 is considered to be located in a cellular network coverage hole of the eNB, and is equivalent to UE9 in FIG. 2.

In the scenarios shown in FIG. 2 and FIG. 3, both UE8 and UE10 may obtain resources used for transmission of D2D control information or D2D data from cellular networks of the corresponding eNBs, and meanwhile, the eNBs may dynamically schedule or semi-persistently schedule UE8 and UE10 corresponding to the eNBs to transmit D2D information; while UE9 and UE11 obtain resources used for transmission of D2D control information or D2D data from a D2D resource pool for out-of-coverage in a contention manner, herein a frequency point of the D2D resource pool for out-of-coverage is the same as or different from frequency points of cellular communication or D2D communication resource pools scheduled by the eNBs in a practical application process.

Embodiment 1

Figure 4:
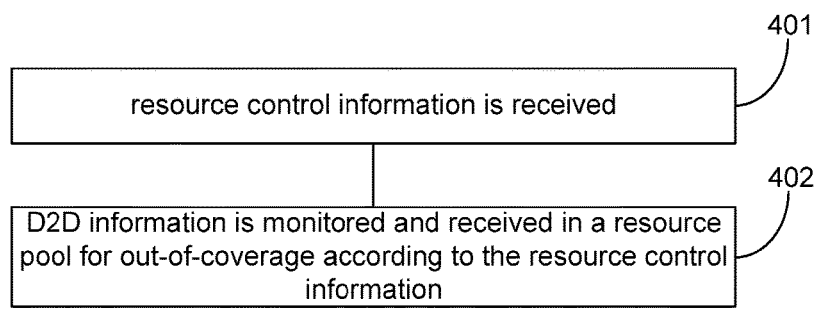
FIG. 4 is a first implementation flowchart of a method for coexistence of cellular communication and D2D communication according to an embodiment of the disclosure.

FIG. 4 is a first implementation flowchart of a method for coexistence of cellular communication and D2D communication according to an embodiment of the disclosure, the method is configured for a UE side, and as shown in FIG. 4, the method includes the following steps.

In Step 401: resource control information is received, herein the resource control information is determined according to resource related information without network coverage.

Specifically, UE receives the resource control information determined by an eNB according to the resource related information without network coverage; and furthermore, the resource related information includes at least one of:

resource pool information for out-of-coverage, resource information, first time-domain resource pattern information and indication information.

Specifically, the resource pool information for out-of-coverage is used for transmission of D2D information corresponding to the UE without network coverage; the resource pool information includes time-domain resource information and/or frequency-domain resource information;

the resource information is information about a resource(s), used for transmission of D2D data, of resources for out-of-coverage required to be received by the UE, herein the resource information includes time-domain resource information and/or frequency-domain resource information;

the first time-domain resource pattern information indicates resource pool information used without network coverage or time-domain resource information used by the D2D data required to be received, or indicates time-domain resource information recommended by the UE and used for reception of D2D information in a resource pool for out-of-coverage; and the indication information is corresponding indication information about whether the UE is required or not required to monitor or receive D2D information in the resource pool for out-of-coverage.

The resource control information includes at least one of:

second time-domain resource pattern information, acknowledgement information, negative acknowledgement information and DRx pattern information.

Specifically, the second time-domain resource pattern information is configured to indicate a time-domain resource for the UE to receive the D2D information in the resource pool for out-of-coverage;

the acknowledgement information is configured to indicate that the UE may receive the D2D information on the resource pool for out-of-coverage or resource indicated by the transmitted resource related information;

the negative acknowledgement information is configured to indicate that the UE may not receive the D2D information on the resource pool for out-of-coverage or resource indicated by the transmitted resource related information; and the DRx pattern information is configured to indicate the UE to receive the D2D information of the resource pool for out-of-coverage during inactive time of a cellular network of the eNB.

Furthermore, the time-domain resource indicated by the second time-domain resource pattern information is a subset of time-domain resources indicated by the first time-domain resource pattern information.

Furthermore, the first time-domain resource pattern information or the second time-domain resource pattern information includes at least one of:

a time-domain resource repetition cycle, a time-domain offset, a time-domain resource duration and a bit character string, herein a bit value corresponding to each bit character in the bit character string indicates whether a corresponding sub-frame is used for transmission of D2D information without network coverage or whether there is D2D information required to be received, or whether the sub-frame may be used for reception of D2D information without network coverage.

In Step 402: D2D information is monitored and received in a resource pool for out-of-coverage according to the resource control information.

Specifically, the UE monitors and receives the D2D information in the resource pool for out-of-coverage according to the resource control information;

here, before the step that the resource control information is received, the method further includes that:

indication information is received; and the resource related information is transmitted through an RRC message, a MAC CE or UCI of a PUCCH according to the indication information.

Before the step that the resource control information is received, the method further includes that: the resource related information is transmitted through the RRC message, the MAC CE or the UCI of the PUCCH.

Here, when the UE receives the indication information, the UE transmits the resource related information according to the indication information; and when the UE does not receive the indication information, the UE directly transmits the resource related information to the eNB.

Specifically, the UE receives the indication information transmitted by the eNB; and the UE transmits the resource related information through the RRC message, the MAC CE or the UCI of the PUCCH according to the indication information.

Furthermore, the method further includes that: after the resource control information is received, the resource control information is transmitted through an air interface.

Here, the UE may transmit the resource control information to UE within network coverage corresponding to the eNB, and may also transmit the resource control information to UE outside the network coverage corresponding to the eNB, and the other UE may determine a transmitting time-domain resource of the D2D information according to the resource control information after receiving the resource control information.

Furthermore, the D2D information includes: D2D control information, and/or D2D data.

Furthermore, the D2D control information includes at least one of:

time-domain and/or frequency-domain resource information occupied by D2D data associated with the D2D control information, an MCS, transmitting power information, resource occupation duration information and D2D group information of the D2D data.

Furthermore, the step that the D2D information is monitored and received in the resource pool for out-of-coverage according to the resource control information includes that:

when the resource control information is the second time-domain resource pattern information, the D2D information is monitored and received in the resource pool for out-of-coverage according to a time-domain resource indicated by the second time-domain resource pattern information;

when the resource control information is the acknowledgement information, the D2D information is monitored and received on a resource pool or resource indicated by the resource related information or the resource pool for out-of-coverage according to the acknowledgement information;

when the resource control information is the negative acknowledgement information, the D2D information is not monitored and received on the resource pool or resource indicated by the resource related information or the resource pool for out-of-coverage according to the negative acknowledgement information; and when the resource control information is the discontinuous reception pattern information, the D2D information is monitored and received in the resource pool for out-of-coverage in the inactive time in the cellular network according to the discontinuous reception pattern information.

Figure 5:
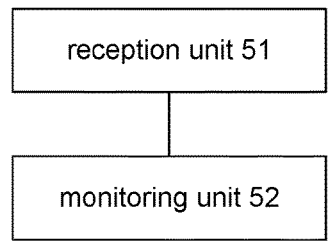
FIG. 5 is a structure diagram of UE according to an embodiment of the disclosure.

Corresponding to the method of embodiment 1, the embodiment of the disclosure provides UE, and as shown in FIG. 5, the UE includes:

a reception unit 51 configured to receive resource related information; and a monitoring unit 52 configured to monitor and receive D2D information in a resource pool for out-of-coverage according to the resource control information.

Furthermore, the reception unit is further configured to receive indication information; and correspondingly, the UE further includes: a transmission unit configured to transmit the resource related information through an RRC message, a MAC CE or UCI of a PUCCH according to the indication information, herein the resource control information is determined according to resource related information without network coverage.

Furthermore, the transmission unit is further configured to, after the resource control information is received, transmit the resource control information through an air interface.

Figure 6:
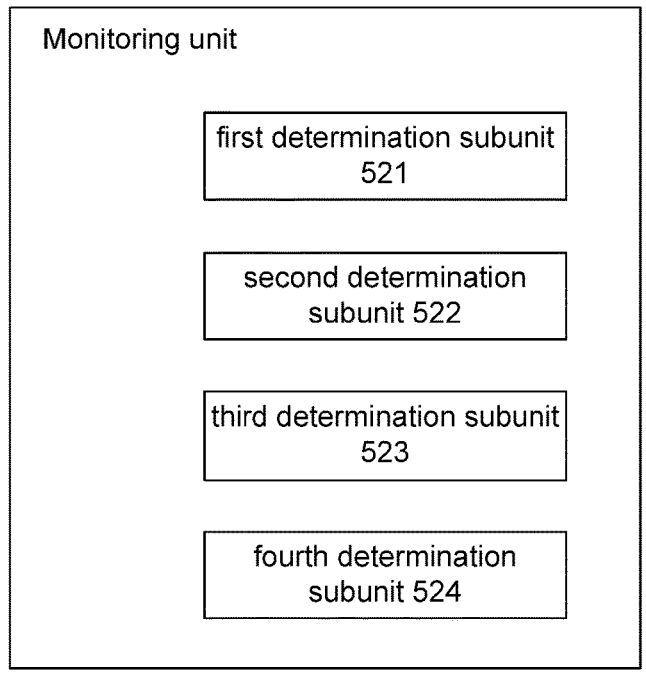
FIG. 6 is a structure diagram of a monitoring unit according to an embodiment of the disclosure.

Furthermore, as shown in FIG. 6, the monitoring unit 52 further includes:

a first determination subunit 521 configured to, when it is determined that the resource control information is the second time-domain resource pattern information, monitor and receive the D2D information in the resource pool for out-of-coverage according to a time-domain resource indicated by the second time-domain resource pattern information;

a second determination subunit 522 configured to, when it is determined that the resource control information is the acknowledgement information, monitor and receive the D2D information on a resource pool or resource indicated by the resource related information or the resource pool for out-of-coverage according to the acknowledgement information;

a third determination subunit 523 configured to, when it is determined that the resource control information is the negative acknowledgement information, not monitor and receive the D2D information on the resource pool or resource indicated by the resource related information or the resource pool for out-of-coverage according to the negative acknowledgement information; and a fourth determination subunit 524 configured to, when it is determined that the resource control information is the discontinuous reception pattern information, monitor and receive the D2D information in the resource pool for out-of-coverage during inactive time of a cellular network according to the discontinuous reception pattern information.

During a practical application, the reception unit and the transmission unit may be implemented by a signal receiver and transmitter or transceiver and the like in the UE; and the monitoring unit may be implemented by combining a Central Processing Unit (CPU), Digital Signal Processor (DSP) or Field Programmable Gate Array (FPGA) in the UE and the signal receiver and transmitter in the UE.

The embodiment of the disclosure further provides a storage medium having stored therein computer-executable instructions configured to execute the method for coexistence of cellular communication and D2D communication in the embodiment.

Embodiment 2

Figure 7:
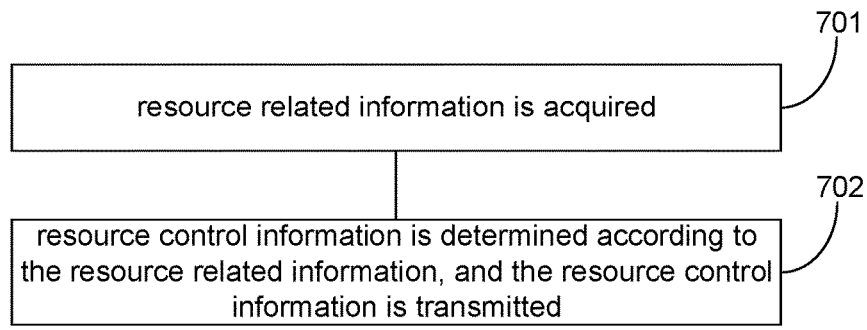
FIG. 7 is a second implementation flowchart of a method for coexistence of cellular communication and D2D communication according to an embodiment of the disclosure.

FIG. 7 is a second implementation flowchart of a method for coexistence of cellular communication and D2D communication according to an embodiment of the disclosure, the method is configured for an eNB side, and as shown in FIG. 7, the method includes the following steps.

In Step 701: resource related information is acquired.

Specifically, an eNB receives resource related information transmitted by UE; or, the eNB acquires resource related information from an OAM system, a network element of a core network or a prose function server.

Furthermore, the resource related information includes at least one of:

resource pool information for out-of-coverage, resource information, first time-domain resource pattern information and indication information.

Furthermore, resource control information includes at least one of:

second time-domain resource pattern information, acknowledgement information, negative acknowledgement information and discontinuous reception pattern information.

In Step 702: resource control information is determined according to the resource related information, and the resource control information is transmitted.

Furthermore, before the step that the resource related information is received, the method further includes that:

indication information is transmitted to through an SIB message, an RRC message, a MAC CE or UCI of a PUCCH indicate whether to transmit the resource related information.

Specifically, the indication information is transmitted through the SIB message, the RRC message, the MAC CE or the UCI of the PUCCH to indicate the UE whether to transmit the resource related information to the eNB.

Furthermore, the method further includes that:

when the determined resource control information is the second time-domain resource pattern information, scheduling for transmitting cellular data, and/or receiving cellular data, and/or transmitting D2D information on a time-domain resource indicated by the second time-domain resource pattern information is avoided;

when the determined resource control information is the acknowledgement information, scheduling for transmitting the cellular data, and/or receiving the cellular data, and/or transmitting the D2D information on a resource pool or resource indicated by resource related information corresponding to the acknowledgement information is avoided; and when the determined resource control information is the negative acknowledgement information, scheduling for transmitting the cellular data, and/or receiving the cellular data, and/or transmitting the D2D information on the resource pool or resource indicated by resource related information corresponding to the negative acknowledgement information is not avoided.

Figure 8:
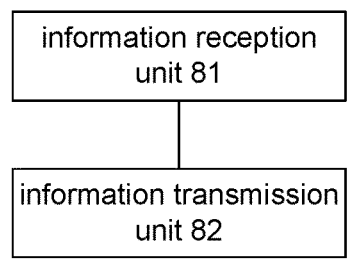
FIG. 8 is a structure diagram of an eNB according to an embodiment of the disclosure.

Corresponding to the method of embodiment 2, the embodiment of the disclosure provides an eNB, and as shown in FIG. 8, the eNB includes:

an information reception unit 81 configured to acquire resource related information; and an information transmission unit 82 configured to determine resource control information according to the resource related information, and transmit the resource control information.

Furthermore, the information reception unit 81 is further configured to acquire resource related information from an OAM system, a network element of a core network or a prose function server; or, is configured to receive resource related information.

Furthermore, if the information reception unit is configured to receive the resource related information, the eNB further includes an indication unit configured to transmit indication information to indicate whether to transmit the resource related information through an SIB message, an RRC message, a MAC CE or UCI of a PUCCH.

Furthermore, the eNB further includes: a first determination unit configured to, when it is determined that the resource control information is second time-domain resource pattern information, avoid scheduling for transmitting cellular data, and/or receiving cellular data, and/or transmitting D2D information on a time-domain resource indicated by the second time-domain resource pattern information;

a second determination unit configured to, when it is determined that the resource control information is acknowledgement information, avoid scheduling for transmitting the cellular data, and/or receiving the cellular data, and/or transmitting the D2D information on a resource pool or resource indicated by resource related information corresponding to the acknowledgement information; and a third determination unit configured to, when it is determined that the resource control information is negative acknowledgement information, not avoid scheduling for transmitting the cellular data, and/or receiving the cellular data, and/or transmitting the D2D information on the resource pool or resource indicated by resource related information corresponding to the negative acknowledgement information.

Here, scheduling refers to scheduling the cellular data or the D2D information in a specific scheduling manner and then transmitting the cellular data or the D2D information to UE.

The embodiment of the disclosure further provides a system for coexistence of cellular communication and D2D communication, which includes: the UE of embodiment 1 and the eNB of embodiment 2.

During a practical application, the information reception unit may be implemented by a receiver in the eNB; the information transmission unit may be implemented by a transmitter in the eNB; and the first determination unit, the second determination unit and the third determination unit may be implemented by a CPU, DSP or FPGA in the eNB and a signal receiver and transmitter in the eNB.

The embodiment of the disclosure further provides a storage medium having stored therein computer-executable instructions configured to execute the method for coexistence of cellular communication and D2D communication in the embodiment.

Embodiment 3

What the embodiment describes is that an eNB transmits D2D information in a D2D resource pool for out-of-coverage to UE to implement coexistence of cellular communication and D2D communication according to a resource pool for out-of-coverage.

Figure 9:
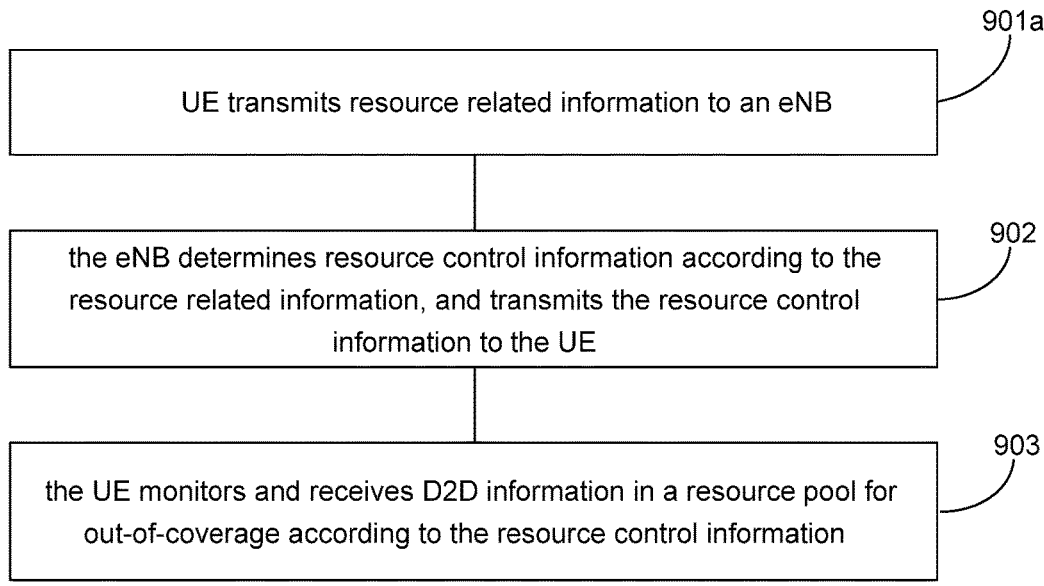
FIG. 9 is a first flowchart of specific implementation of a method for coexistence of cellular communication and D2D communication according to an embodiment of the disclosure.
Figure 10:
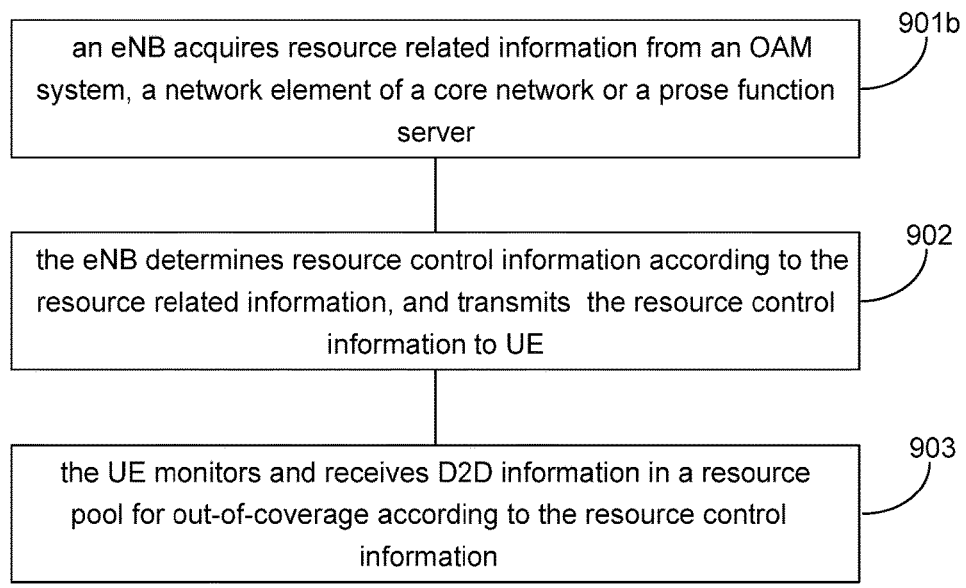
FIG. 10 is a second flowchart of specific implementation of a method for coexistence of cellular communication and D2D communication according to an embodiment of the disclosure.

FIG. 9 is a first flowchart of specific implementation of a method for coexistence of cellular communication and D2D communication according to an embodiment of the disclosure, FIG. 10 is a second flowchart of specific implementation of a method for coexistence of cellular communication and D2D communication according to an embodiment of the disclosure, and as shown in FIG. 9 and FIG. 10, the method includes the following steps.

In Step 901*a*: UE transmits resource related information to an eNB.

Here, the resource related information includes at least one of:

1) resource pool information for out-of-coverage: the resource pool information for out-of-coverage is resource pool information used without network coverage or D2D resource pool information used without network coverage, and is used for transmission of D2D control information and/or D2D data corresponding to the UE to the UE without network coverage; the resource pool information includes time-domain resource information and/or frequency-domain resource information;

2) resource information: the resource information is resource information used for transmission of D2D information received by the UE without network coverage, herein the resource information includes time-domain resource information and/or frequency-domain resource information;

3) first time-domain resource pattern information: the first time-domain resource pattern information is configured to indicate resource pool information used without network coverage or time-domain information of the resource information used for transmission of the D2D data required to be received, or indicate time-domain resources recommended by the UE and configured to receive or use D2D information in the resource pool for out-of-coverage; optionally, the time-domain resource pattern information may be DRx pattern information;

4) indication information: the indication information is corresponding indication information about whether the UE is required or not required to monitor or receive D2D information in the resource pool for out-of-coverage, and indication information corresponding to D2D reception, and the indication information may also indicate that the D2D information is D2D control information or D2D data;

that is, the indication information indicates whether the UE is required or not required to receive the D2D control information, so as to determine whether there is information in which the UE is interested or D2D information required to be received; or, the indication information indicates the UE to receive the D2D control information to determine whether there is information in which the UE is interested or D2D information required to be received.

Here, the D2D control information is resource information occupied by D2D data associated with the D2D control information and using information, and the resource information and the using information include at least one of:

time-domain and/or frequency-domain resource information occupied by the D2D data associated with the D2D control information, an MCS adopted for the D2D control information, transmitting power information, resource occupation duration information and D2D group information of the D2D data.

Optionally, before the UE transmits the resource related information to the eNB, the eNB may indicate the UE whether to transmit the resource related information to the eNB;

specific steps include that:

the eNB transmits indication information to the UE to indicate the UE whether to transmit the resource related information in a manner of an SIB message, an RRC message, a MAC CE, DCI of a PUCCH and the like; and the UE receives the indication information, and transmits the resource related information to the eNB through the RRC message, the MAC CE, the UCI of the PUCCH or the like according to the indication information.

In Step 901*b*: the eNB acquires resource related information from an OAM system, a network element of a core network or a prose function server.

Here, the resource related information is resource pool information used without network coverage.

It is important to note that the eNB may obtain the resource related information by both Step 901*a* and 901*b* or obtain the resource related information by Step 901*a* or 901*b*. For example, the eNB obtains the resource information used for transmission of the D2D information required to be received by the UE without network coverage by Step 901*a*, or the eNB obtains the corresponding indication information about whether the UE is required or not required to monitor the D2D information in the resource pool for out-of-coverage and the indication information corresponding to D2D information reception by Step 901*a*, and obtains the resource pool information for out-of-coverage by Step 901*b*.

In Step 902: the eNB determines resource control information according to the resource related information, and transmits the resource control information to the UE.

Here, the resource control information includes at least one of:

1) second time-domain resource pattern information: the second time-domain resource pattern information is configured to indicate a time-domain resource for the UE to receive the D2D information in the resource pool for out-of-coverage; optionally, if the resource related information transmitted to the eNB by the UE includes the first time-domain resource pattern information, the time-domain resource indicated by the second time-domain resource pattern information in the resource control information determined by the eNB according to the resource related information is a subset of the time-domain resources indicated by the first time-domain resource pattern information;

2) acknowledgement information: the acknowledgement information is configured to indicate that the UE may receive the D2D information on a resource pool for out-of-coverage or resource indicated by the transmitted resource related information;

3) negative acknowledgement information: the negative acknowledgement information is configured to indicate that the UE may not receive the D2D information on the resource pool for out-of-coverage or resource indicated by the transmitted resource related information; and 4) DRx pattern information: the DRx pattern information is configured to indicate that the UE may receive the D2D information of the resource pool for out-of-coverage during inactive time of a cellular network of the eNB.

Specifically, a principle for the eNB to determine the resource control information according to the resource related information includes that:

1) if a frequency point of the resource pool for out-of-coverage is the same as a frequency point of a resource pool scheduled for D2D communication within the cellular network or coverage of the eNB, the eNB avoids scheduling for transmitting cellular data of the UE and transmitting D2D information on a time-domain resource where the UE may receive D2D information in the resource pool for out-of-coverage as much as possible;

2) if the frequency point of the resource pool for out-of-coverage is different from the frequency point of the resource pool scheduled for D2D communication within the cellular network or coverage of the eNB, the eNB avoids scheduling for transmitting and receiving the cellular data of the UE and scheduling for transmitting the D2D information on the time-domain resource where the UE may receive the D2D information in the resource pool for out-of-coverage as much as possible; and 3) the eNB determines priorities of uncovered D2D information reception, D2D information transmitting, cellular data transmitting and cellular data reception of the UE according to a strategy of an operating company, a local strategy, service information or a service priority, and preferably executes high-priority data reception or transmitting according to the priorities.

In Step 903: the UE monitors and receives D2D information in the resource pool for out-of-coverage according to the resource control information.

Specifically:

1) when the resource control information is the second time-domain resource pattern information, the UE monitors and receives the D2D information in the resource pool for out-of-coverage according to the time-domain resource indicated by the second time-domain resource pattern information;

2) when the resource control information is the acknowledgement information, the UE monitors and receives the D2D information on the resource pool or resource indicated by the resource related information or the resource pool for out-of-coverage according to the acknowledgement information;

3) when the resource control information is the negative acknowledgement information, the UE does not monitor and receive the D2D information on the resource pool or resource indicated by the resource related information or the resource pool for out-of-coverage according to the negative acknowledgement information; and 4) when the resource control information is the DRx pattern information, the D2D information is monitored and received in the resource pool for out-of-coverage in the inactive time in the cellular network according to the DRx pattern information.

The embodiment of the disclosure further provides a storage medium having stored therein computer-executable instructions configured to execute the method for coexistence of cellular communication and D2D communication in the embodiment.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the implementation mode of the embodiment of the disclosure, it is important to point out that those skilled in the art may also make a plurality of improvements and embellishments without departing from the principle of the embodiment of the disclosure, and these improvements and embellishments shall fall within the scope of protection of the embodiment of the disclosure.

INDUSTRIAL APPLICABILITY

According to the embodiment of the disclosure, an opportunity for UE within cellular network coverage of an eNB to receive D2D information on a resource pool outside the network coverage may be controlled by the eNB, that is, the eNB may control the opportunity for the UE within the network coverage to monitor and receive the D2D information in the resource pool for out-of-coverage, so that influence of D2D communication outside the network coverage on cellular communication and D2D communication within the network coverage may be avoided, and moreover, the UE within the network coverage may correctly and effectively receive D2D information transmitted by UE outside the network coverage.

What is claimed is:

1. A method for coexistence of cellular communication and Device-to-Device (D2D) communication, comprising:
  receiving resource control information; and
  monitoring and receiving D2D information in a resource pool for out-of-coverage according to the resource control information,
  wherein the resource control information comprises at least one of second time-domain resource pattern information, acknowledgement information, negative acknowledgement information or Discontinuous Reception (DRx) pattern information, and the second time-domain resource pattern information comprises at least one of a time-domain resource repetition cycle, a time-domain offset, a time-domain resource duration or a bit character string, and
  wherein a bit value corresponding to each bit character in the bit character string indicates whether a corresponding sub-frame is used for transmission of D2D information without network coverage or whether there is D2D information required to be received, or whether the corresponding sub-frame can be used for reception of D2D information without network coverage.

2. The method according to claim 1, further comprising: before receiving the resource control information,
  receiving indication information; and
  transmitting resource related information through a Radio Resource Control (RRC) message, a Media Access Control (MAC) Control Element (CE) or Uplink Control Information (UCI) of a Physical Uplink Control Channel (PUCCH) according to the indication information.

3. The method according to claim 1, further comprising: before receiving the resource control information, transmitting resource related information through an RRC message, an MAC CE or UCI of a PUCCH.

4. The method according to claim 1, further comprising:
  after the resource control information is received, transmitting the resource control information through an air interface.

5. The method according to claim 1, wherein the D2D information comprises: D2D control information, and/or D2D data.

6. The method according to claim 5, wherein the D2D control information comprises at least one of:
  time-domain and/or frequency-domain resource information occupied by D2D data associated with the D2D control information, a Modulation and Coding Scheme (MCS), transmitting power information, resource occupation duration information or D2D group information of the D2D data.

7. The method according to claim 2, wherein the resource related information comprises at least one of:
  resource pool information for out-of-coverage, resource information, first time-domain resource pattern information or the indication information.

8. The method according to claim 7, wherein the resource pool information for out-of-coverage is used for transmission of D2D information corresponding to User Equipment (UE) without network coverage;
  the resource information is information about a resource (s), used for transmission of D2D data, of resources for out-of-coverage required to be received by the UE;
  the first time-domain resource pattern information indicates resource pool information used without network coverage or time-domain resource information used by the D2D data required to be received, or indicates time-domain resource information recommended by the UE and used for reception of D2D information in the resource pool for out-of-coverage; and
  the indication information is indication information about whether the UE is required or not required to monitor or receive D2D information in the resource pool for out-of-coverage.

9. The method according to claim 1, wherein monitoring and receiving the D2D information in the resource pool for out-of-coverage according to the resource control information comprises:
  when the resource control information is the second time-domain resource pattern information, monitoring and receiving the D2D information in the resource pool for out-of-coverage according to a time-domain resource indicated by the second time-domain resource pattern information;
when the resource control information is the acknowledgement information, monitoring and receiving the D2D information on a resource pool or resource indicated by the resource related information or the resource pool for out-of-coverage according to the acknowledgement information;
when the resource control information is the negative acknowledgement information, not monitoring and receiving the D2D information on the resource pool or resource indicated by the resource related information or the resource pool for out-of-coverage according to the negative acknowledgement information; and
when the resource control information is the DRx pattern information, monitoring and receiving the D2D information in the resource pool for out-of-coverage during inactive time of a cellular network according to the DRx pattern information.

10. The method according to claim 9, wherein the time-domain resource indicated by the second time-domain resource pattern information is a subset of time-domain resources indicated by a first time-domain resource pattern information.

11. A method for coexistence of cellular communication and Device-to-Device (D2D) communication, comprising:
acquiring resource related information; and
determining resource control information according to the resource related information, and transmitting the resource control information,
wherein the resource control information comprises at least one of second time-domain resource pattern information, acknowledgement information, negative acknowledgement information or Discontinuous Reception (DRx) pattern information, and the second time-domain resource pattern information comprises at least one of a time-domain resource repetition cycle, a time-domain offset, a time-domain resource duration or a bit character string, and
wherein a bit value corresponding to each bit character in the bit character string indicates whether a corresponding sub-frame is used for transmission of D2D information without network coverage or whether there is D2D information required to be received, or whether the corresponding sub-frame can be used for reception of D2D information without network coverage.

12. The method according to claim 11, wherein acquiring the resource related information comprises:
acquiring resource related information from an Operation Administration and Maintenance (OAM) system, a network element of a core network or a prose function server; or
receiving resource related information transmitted by User Equipment (UE).

13. The method according to claim 12, further comprising: before receiving the resource related information,
transmitting indication information through a System Information Block (SIB) message, a Radio Resource Control (RRC) message, a Media Access Control (MAC) Control Element (CE) or Uplink Control Information (UCI) of a Physical Uplink Control Channel (PUCCH), so as to indicate whether to transmit the resource related information.

14. The method according to claim 11, wherein the resource related information comprises at least one of:
resource pool information for out-of-coverage, resource information, first time-domain resource pattern information or indication information.

15. The method according to claim 11, further comprising:
when the resource control information is the second time-domain resource pattern information, avoiding scheduling for transmitting cellular data and/or receiving cellular data and/or transmitting D2D information on a time-domain resource indicated by the second time-domain resource pattern information;
when the resource control information is the acknowledgement information, avoiding scheduling for transmitting the cellular data and/or receiving the cellular data and/or transmitting the D2D information on a resource pool or resource indicated by resource related information corresponding to the acknowledgement information; and
when the resource control information is the negative acknowledgement information, not avoiding scheduling for transmitting the cellular data and/or receiving the cellular data and/or transmitting the D2D information on the resource pool or resource indicated by resource related information corresponding to the negative acknowledgement information.

16. A method for coexistence of cellular communication and Device-to-Device (D2D) communication, comprising:
acquiring, by an Evolved Node B (eNB), resource related information;
determining, by the eNB, resource control information according to the resource related information, and transmitting the resource control information to User Equipment (UE); and
monitoring and receiving, by the UE, D2D information in a resource pool for out-of-coverage according to the resource control information,
wherein the resource control information comprises at least one of second time-domain resource pattern information, acknowledgement information, negative acknowledgement information or Discontinuous Reception (DRx) pattern information, and the second time-domain resource pattern information or comprises at least one of a time-domain resource repetition cycle, a time-domain offset, a time-domain resource duration or a bit character string, and
wherein a bit value corresponding to each bit character in the bit character string indicates whether a corresponding sub-frame is used for transmission of D2D information without network coverage or whether there is D2D information required to be received, or whether the corresponding sub-frame can be used for reception of D2D information without network coverage.

17. The method according to claim 16, wherein acquiring, by the eNB, the resource related information comprises:
acquiring, by the eNB, resource related information from an Operation Administration and Maintenance (OAM) system, a network element of a core network or a prose function server; or
receiving, by the eNB, resource related information transmitted by the UE.

* * * * *